(12) United States Patent
Mihara

(10) Patent No.: US 12,095,346 B2
(45) Date of Patent: Sep. 17, 2024

(54) COOLING STRUCTURE FOR ELECTRIC MOTOR

(71) Applicant: HONDA MOTOR CO., LTD., Tokyo (JP)

(72) Inventor: Takahiro Mihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 450 days.

(21) Appl. No.: 17/589,993

(22) Filed: Feb. 1, 2022

(65) Prior Publication Data

US 2022/0255403 A1 Aug. 11, 2022

(30) Foreign Application Priority Data

Feb. 8, 2021 (JP) ................................. 2021-018244

(51) Int. Cl.
*H02K 9/197* (2006.01)
*B63H 21/17* (2006.01)

(52) U.S. Cl.
CPC ............. *H02K 9/197* (2013.01); *B63H 21/17* (2013.01)

(58) Field of Classification Search
CPC ............................... H02K 9/197; B63H 21/17
See application file for complete search history.

(56) References Cited

U.S. PATENT DOCUMENTS

2022/0255403 A1* 8/2022 Mihara ................. H02K 9/197
2022/0297814 A1* 9/2022 Mihara ................. B63H 20/002

FOREIGN PATENT DOCUMENTS

| CN | 104079096 B | * | 3/2019 | ........... H02K 15/085 |
| EP | 3533704 B1 | * | 9/2023 | ........... B63H 20/007 |
| JP | 2020068578 A | * | 4/2020 | ............... H02K 9/19 |

* cited by examiner

*Primary Examiner* — S. Joseph Morano
*Assistant Examiner* — Jovon E Hayes
(74) *Attorney, Agent, or Firm* — Armstrong Teasdale LLP

(57) ABSTRACT

In an outboard motor including a vertical electric motor, a cooling structure for the vertical electric motor comprises a cooling oil supply member positioned above the stator and including a plurality of outlets for dropping cooling oil on an upper surface of the stator, the outlets being arranged circumferentially in a coaxial relationship to the stator, and the outlets are configured such that an amount of cooling oil that is dropped on a part of the stator located on a first axis on a plane orthogonal to the vertical axis is smaller than an amount of cooling oil that is dropped on a part of the stator located on a second axis which is orthogonal to the first axis on the plane orthogonal to the vertical axis.

5 Claims, 5 Drawing Sheets

COOLING STRUCTURE FOR ELECTRIC MOTOR

TECHNICAL FIELD

The present invention relates to a cooling structure for a vertical electric motor of an electric mobile body, and in particular to a cooling structure for a vertical electric motor of an outboard engine.

PRIOR ART

As a cooling structure for a vertical electric motor having a vertically extending rotor shaft, it is known to place a hollow annular member which is coaxial with the rotor, and has cooling oil circulating therein immediately above the rotor of the electric motor, and drip the cooling oil onto the rotor via slits provided on the bottom of the hollow annular member. See JP2020-068578A, for instance.

If the electric motor is positioned precisely located at all times, the cooling oil drips onto the coils of the electric motor as designed. However, if the electric motor tilts from the vertical position, the cooling oil may fail to drop onto the coils. In such a case, the oil may flow into or drop into the air gap between the rotor and stator. This causes an increase in the friction of the motor and other undesired consequences, and is desired to be avoided.

When the vertical electric motor is used as the electric motor for an outboard motor, the vertical electric motor is inevitably tilted owing to the pitching motion of the boat. An outboard motor is also tilted relative to the boat for trim adjustment. As a result, the cooling oil may enter the air gap between the rotor and the stator to an unacceptable extent.

SUMMARY OF THE INVENTION

In view of such a problem of the prior art, a primary object of the present invention is to provide a cooling structure for a vertical electric motor which can favorably cool the electric motor and prevent the cooling oil from entering the air gap between the stator and rotor of the electric motor.

To achieve such an object, the present invention provides a cooling structure for an electric motor (16) of an electric mobile body (10), the electric mobile body further including a propelling device (18) connected to the electric motor in a power transmitting relationship, the electric motor including a motor case (20), a rotor (28) rotatably supported by the motor case around a substantially vertical axis, and a stator (30) fixed to the casing and configured to interact with the rotor, wherein the cooling structure comprises a cooling oil supply member (50) positioned above the stator and including a plurality of outlets (54) for dropping cooling oil on an upper surface of the stator, the outlets being arranged circumferentially in a coaxial relationship to the stator, and wherein the outlets are configured such that an amount of cooling oil that is dropped on a part of the stator located on a first axis (B) on a plane orthogonal to the vertical axis is smaller than an amount of cooling oil that is dropped on a part of the stator located on a second axis (A) which is orthogonal to the first axis on the plane orthogonal to the vertical axis.

Thereby, the cooling oil is prevented from entering the air gap of the electric motor while ensuring a favorable cooling performance even when the electric motor is tilted around the second axis.

Preferably, the cooling oil outlets are arranged at substantially equal intervals circumferentially, and the cooling oil outlets located on the first axis are smaller in size than those located on the second axis.

Thereby, the amount of the cooling oil dropped from the cooling oil supply member is smaller in amount in the part of the stator on the first axis than in the part of the stator on the second axis. Thereby, the chance of the cooling oil entering the air gap of the electric motor can be minimized when the electric motor is tilted around the second axis.

Alternatively, it may be arranged such that the cooling oil outlets are provided with a substantially same size, and the cooling oil outlets are more sparsely populated on the first axis than on the second axis.

Thereby, the amount of the cooling oil dropped from the cooling oil supply member is smaller in amount in the part of the stator on the first axis than in the part of the stator on the second axis. As a result, the chance of the cooling oil entering the air gap of the electric motor can be minimized when the electric motor is tilted around the second axis.

Preferably, the cooling oil supply member comprises a substantially annular pipe member positioned immediately above the stator in a coaxial relationship.

Thereby, the structure of the cooling oil supply member can be simplified.

Preferably, the electric mobile body consists of watercraft, and the electric motor and the propelling device jointly form an outboard motor (12), the first axis corresponding to a fore and aft axis of the watercraft.

Thereby, the cooling oil is prevented from entering the air gap of the electric motor even when the watercraft undergoes a pitching motion.

Preferably, the outboard motor is attached to the watercraft so as to be pivotable around the second axis.

In this case, the cooling oil is prevented from entering the air gap of the electric motor even when the trim of the outboard motor is changed.

The present invention thus provides a cooling structure for a vertical electric motor which can favorably cool the electric motor and prevent the cooling oil from entering the air gap between the stator and rotor of the electric motor.

BRIEF DESCRIPTION OF THE DRAWING(S)

DESCRIPTION OF THE PREFERRED EMBODIMENT(S)

Preferred embodiments of the present invention are described in the following with reference to the appended drawings.

Figure 1A:
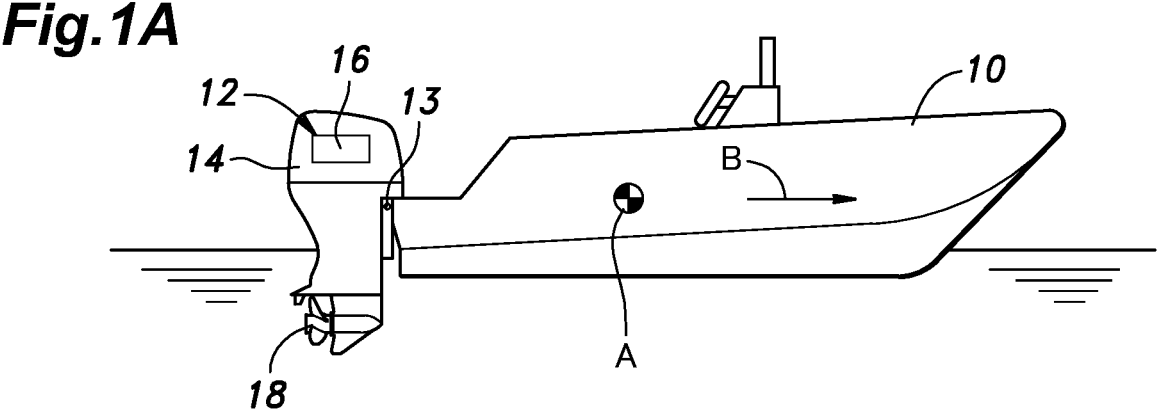
FIG. 1A is a side view of a boat in a normal horizontal position.

FIG. 1 shows a boat 10 fitted with an outboard motor 12 at various pitch angles. The lateral axis of this boat 10 is denoted by A, and the fore and aft axis of this boat is denoted by B. The outboard motor 12 is provided with a vertically elongated housing 14, an electric motor 16 received in an upper part of the housing 14, and a propeller 18 attached to a propeller shaft extending rearward from a lower part of the housing 14. The outboard motor 12 is attached to the boat 10 via a support shaft 13 extending laterally so that the direction of the propeller shaft of the outboard motor 12 relative to the boat 10 can be adjusted by tilting the outboard motor 12 around the support shaft 13 having an axis in parallel with the lateral axis A. This is known as trimming of the outboard motor 12.

The boat 10 is normally horizontal as shown in (A) of FIG. 1, but may pitch in either direction (bow up and bow down) as shown in (B) and (C) of FIG. 1, respectively, depending on the condition of the surrounding body of water and the condition of the boat itself. The trim of the outboard motor 12 (the pitch angle of the propeller shaft relative to the normal direction) may also be adjusted for a desired performance of the boat 10 by using a trim mechanism not shown in the drawings. For these reasons, the pitch angle of the outboard motor 12 relatively to the horizontal direction may vary to a significant extent.

Figure 2:
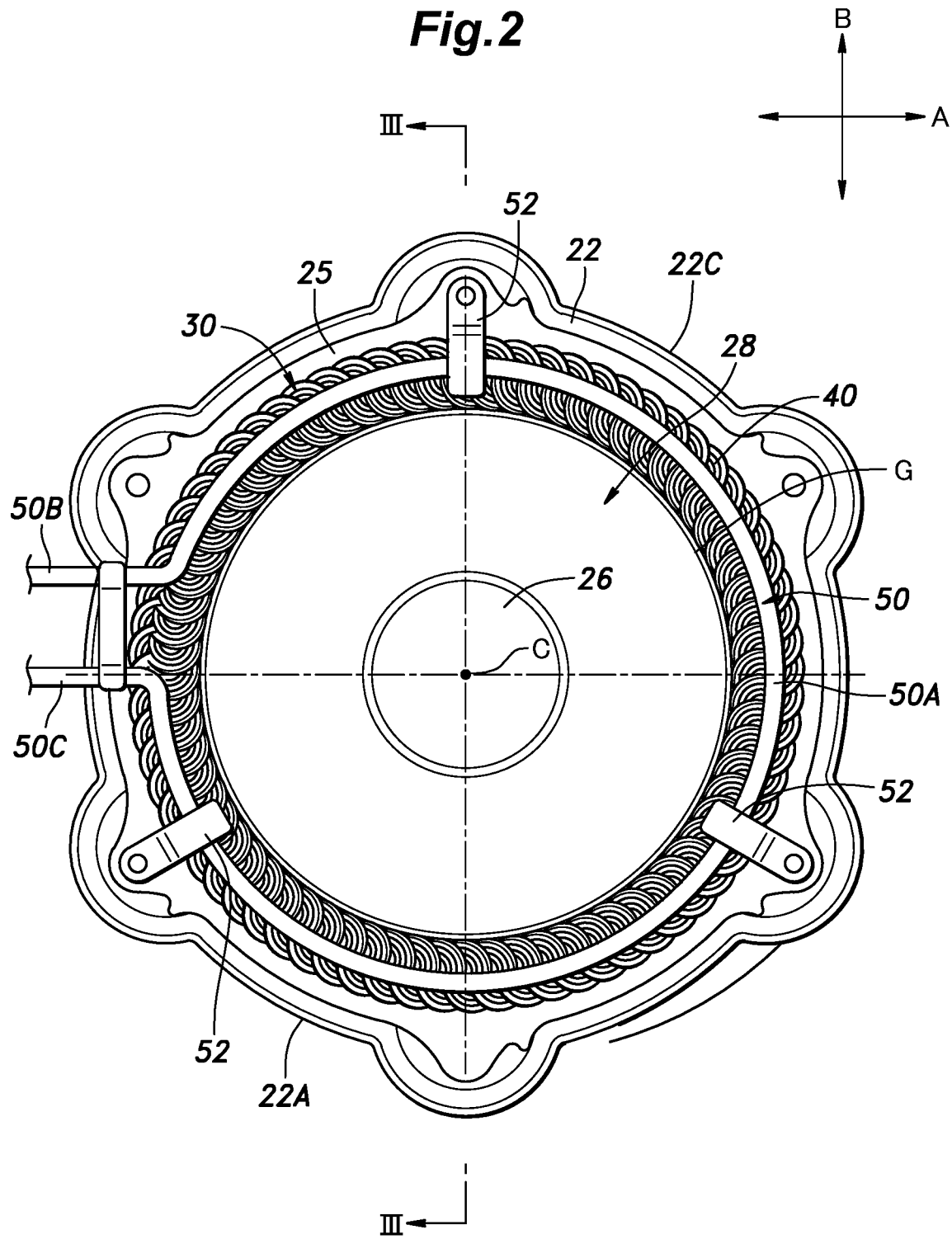
FIG. 2 is a plan view of an electric motor provided with a cooling structure according to a first embodiment of the present invention with an upper case removed.
Figure 3:
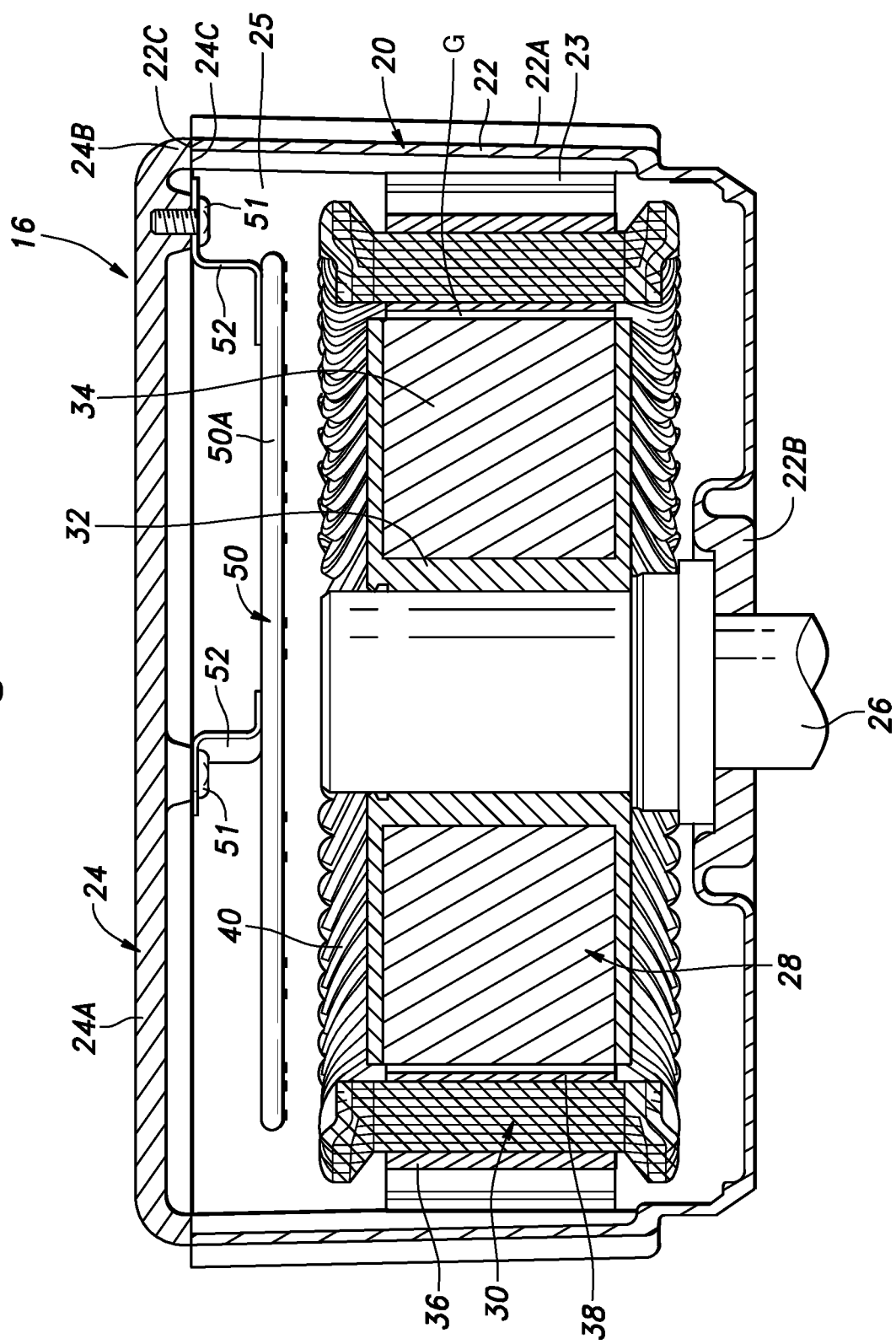
FIG. 3 is a sectional view taken along of FIG. 2.
Figure 4:
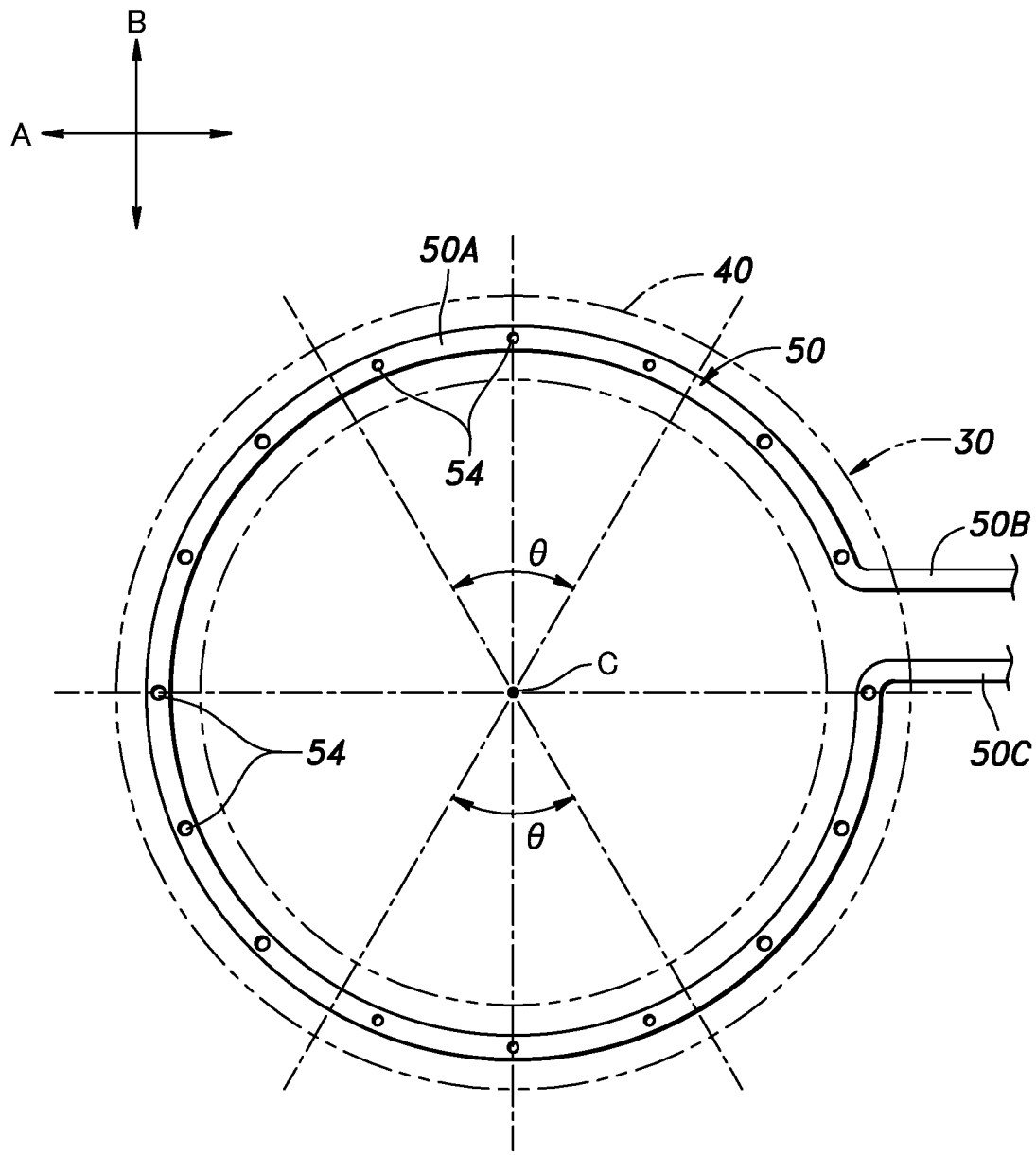
FIG. 4 is a bottom view showing a cooling oil supply pipe of the cooling structure of the first embodiment.

The outboard motor 12 is provided with an electric motor 16 which drives the propeller shaft of the propeller 18 via a power transmission mechanism not shown in the drawing. The electric motor 16 is provided with a cooling structure according to the present invention. Referring to FIGS. 2 to 4, the electric motor 16 is provided with a cylindrical motor case having a vertically extending axis, and formed by a lower case 22 and an upper case 24. The lower case 22 includes a cylindrical side wall 22A and a bottom wall 22B that closes the lower end of the side wall 22A. The upper case 24 has a disc-shaped top wall 24A and a circumferential flange 24B provided along the outer edge of the top wall 24A and projects slightly downward in the axial direction. The upper case 24 is joined to the lower case 22 by fasteners not shown in the drawings in such a manner that the lower edge 24C of the circumferential flange 24B abuts against the upper edge 22C of the side wall 22A. Thus, a motor chamber 25 is defined by the lower case 22 and the upper case 24.

The electric motor 16 includes a rotor shaft 26 extending in a substantially vertical direction and rotatably supported by the bottom wall 22B of the lower case 22, a rotor 28 fixed to the rotor shaft 26, and a stator 30 fixed to the side wall 22A of the lower case 22 so as to surround the rotor 28, all in a coaxial relationship. The rotor shaft 26 extends downward, and is coupled to the propeller shaft of the propeller 18 (see FIG. 1) via a transmission mechanism not shown in the drawings. Thus, the propeller 18 is coupled to the rotor 28 of the electric motor 16 in a power transmitting relationship.

The rotor 28 includes a rotor core 34 attached to the rotor shaft 26 via a rotor hub 32. The rotor core 34 consists of a substantially cylindrical iron core centered on the central axis of the rotor shaft 26, and rotates integrally with the rotor hub 32 and the rotor shaft 26.

The stator 30 of the electric motor 16 includes an annular stator core 36 concentrically surrounding the rotor core 34 and provided with a plurality of teeth 38 projecting radially inward therefrom, and coils 40 wound around the respective teeth 38. The stator core 36 is fixedly attached to the side wall 22A of the lower case 22.

A plurality of permanent magnets are embedded in the rotor core 34, and the electric motor 16 is formed as a permanent magnet synchronous motor. Other forms of electric motors can also be used. For instance, the electric motor 16 may consist of a synchronous reluctance motor, a switch reluctance motor, or any other form of electric motor that does not require permanent magnets.

As shown in FIG. 3, an air gap G is defined between the outer peripheral surface of the rotor 28 and the inner peripheral surface of the stator 30, and has an annular shape in a plan view.

From the lower surface of the top wall 24A of the upper case 24 is suspended a substantially annular cooling oil supply pipe 50 by a plurality of brackets 52 fixed the cooling oil supply pipe 50 (by welding or brazing) and fastened to the upper case 24 by screws 51. The cooling oil supply pipe 50 is coaxially arranged on a horizontal plane located immediately above the stator 30 with a certain space defined therebetween, and includes a main part 50A which is C-shaped and has two ends opposing each other with a small gap defined therebetween, an inlet pipe section 50B connected to one of the opposing two ends of the main part 50A and extending away from the center of the main part 50A, and an outlet pipe section 50C connected the other opposing end of the main part 50A thereof and extending away from the center of the main part 50A in parallel with the inlet pipe section 50B.

The lower surface of the main part 50A is provided with a plurality of cooling oil holes 54 arranged at a regular interval along the circumferential direction and opposing the upper surface of the stator 30. The cooling oil holes 54 are positioned so as to cause the oil circulating in the main part 50A to drop onto the upper surface of the stator 30, particularly the upper surface of the coils 40 in the form of oil droplets or oil streaks. Therefore, the cooling oil holes 54 are arranged along a circle located slightly radially outward of the inner periphery or the inner profile of the stator 30. Therefore, when the electric motor 16 is positioned normally or horizontally, the cooling oil will not directly drop onto the air gap G. In this embodiment, the cooling oil holes 54 are circumferentially arranged along the length of the main part 50A of the cooling oil supply pipe 50 at regular intervals.

The cooling oil dropped onto the upper surface of the stator 30 from the cooling oil hole 54 flows down to the lower part of the lower case 22 through an oil passage 23 defined between the side wall 22A and the stator 30, and is expelled from a cooling oil drain hole (not shown in the drawings) provided in the bottom wall 22B of the lower case 22. The cooling oil drained from the motor case 20 is recirculated back into the inlet pipe section 50B of the cooling oil supply pipe 50 via an oil circuit not shown in the drawings.

Suppose that the outboard motor 12 is fixed to the boat 10, and no trim adjustment around the support shaft 13 is made. Then, the pitch angle of the boat 10 is equal to the pitch angle of the outboard motor 12. If a trim adjustment is made, the absolute pitch angle of the outboard motor 12 will be found by adding or subtracting the trim angle to or from the pitch angle of the boat 10.

In this embodiment, the inlet pipe section 50B and the outlet pipe section 50C are located on the right side (starboard side) of the boat 10. The cooling oil holes 54 are arranged at substantially equal intervals around the vertical central axis of the stator 30, but the diameter of the cooling oil holes 54 that are located laterally central part of the cooling oil supply pipe 50 (the cooling oil supply pipe 50 on the fore and aft axis B) is smaller than that of the remaining cooling oil holes 54. In other words, the cooling oil holes 54 in the laterally central part of the cooling oil supply pipe 50 have a first diameter, and the remaining oil holes have a second diameter which is larger than the first diameter. In an alternate embodiment, the cooling oil holes 54 located within an angular range θ centered around the fore and aft axis B (or the three cooling oil holes 54 located on the fore end and the aft end, respectively) have a smaller diameter than that of the remaining cooling oil holes 54.

Thus, the cooling oil that drops onto the fore and aft parts of the stator 30 (those located along or on the fore and aft axis B) is smaller in amount than that drops onto the lateral parts of the stator 30 (those located along or on the lateral axis A).

Figure 1B:
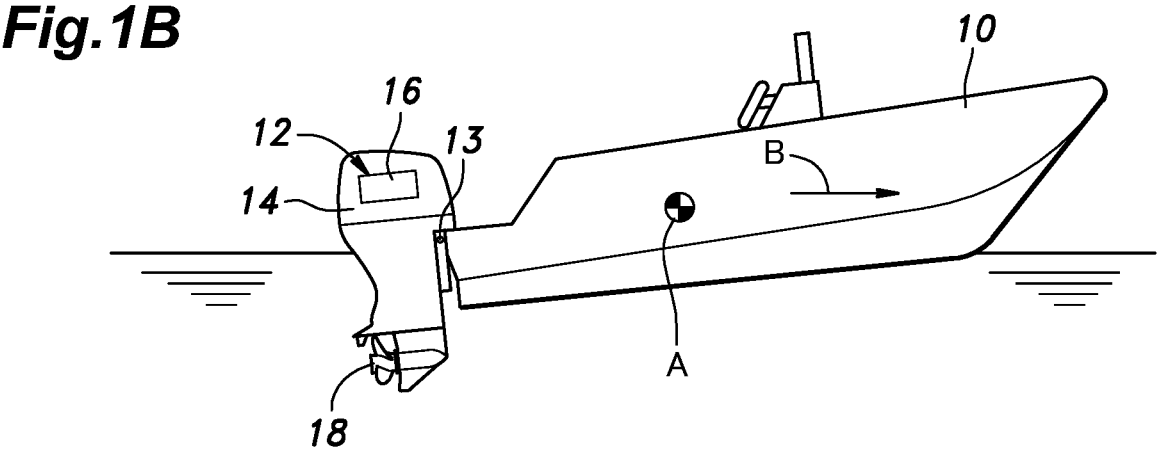
FIG. 1B is a side view of the boat pitched bow up.
Figure 1C:
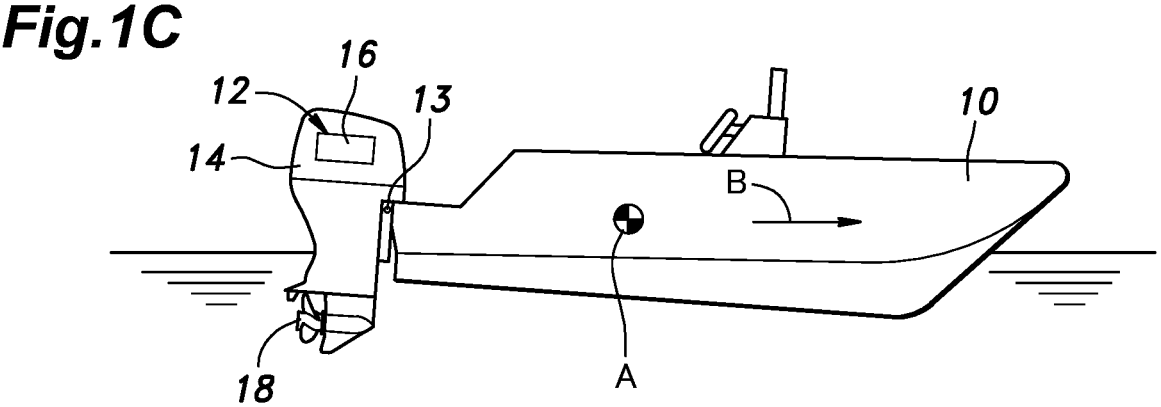
FIG. 1C is a side view of the boat pitched bow down.

When the boat 10 pitches around the lateral axis A, the boat 10 pitches to the bow down state shown in FIG. 1(B) or the bow up state shown in FIG. 1(C). As a result, the electric motor 16 of the outboard motor 12 tilts around the lateral axis A, and the stator 30 also tilts in a corresponding manner.

In such a situation, the cooling oil discharged from the cooling oil holes 54 on the fore and aft axis may drop onto parts of the stator 30 radially outward or inward of the coils 40 as compared to the case where the pitching angle of the boat 10 is zero, whereas the cooling oil discharged from the oil holes on the lateral axis continues to drop onto the coils of the stator 30 irrespective of the pitching angle. As a result, the cooling oil dropping onto the fore and aft end parts of the stator 30 tends to flow along the upper surface of the rotor into the air gap G defined between the rotor 28 and the stator 30. At any event, the cooling oil discharged from the cooling oil holes 54 on the fore and aft axis is more likely to flow into the air gap G than the cooling oil discharged from the oil holes 54 on the fore and aft axis due to the pitching of the outboard motor 12.

According to the present embodiment, owing to the difference in the diameters of the cooling oil holes 54 as discussed above, the amount of cooling oil dropped from the cooling oil holes 54 located on the fore and aft axis B is smaller than the amount of cooling oil dropped from the cooling oil holes 54 located on the lateral axis A so that the amount of the cooling oil that flows into the air gap G is reduced as compared to the case where the cooling oil is dropped from the annular cooling oil supply pipe 50 in a circumferentially even manner.

As a result, the amount of cooling oil that enters the air gap G can be minimized so that friction against the rotation of the rotor 28 can be minimized. Also, even when the oil should contain foreign matters, such foreign matters are less likely to enter the air gap G.

This advantageous operation of the cooling structure of this embodiment can be obtained not only when the boat 10 is operated at a large pitch angle but also when the outboard motor 12 is trimmed by using a corresponding trim mechanism.

Figure 5:
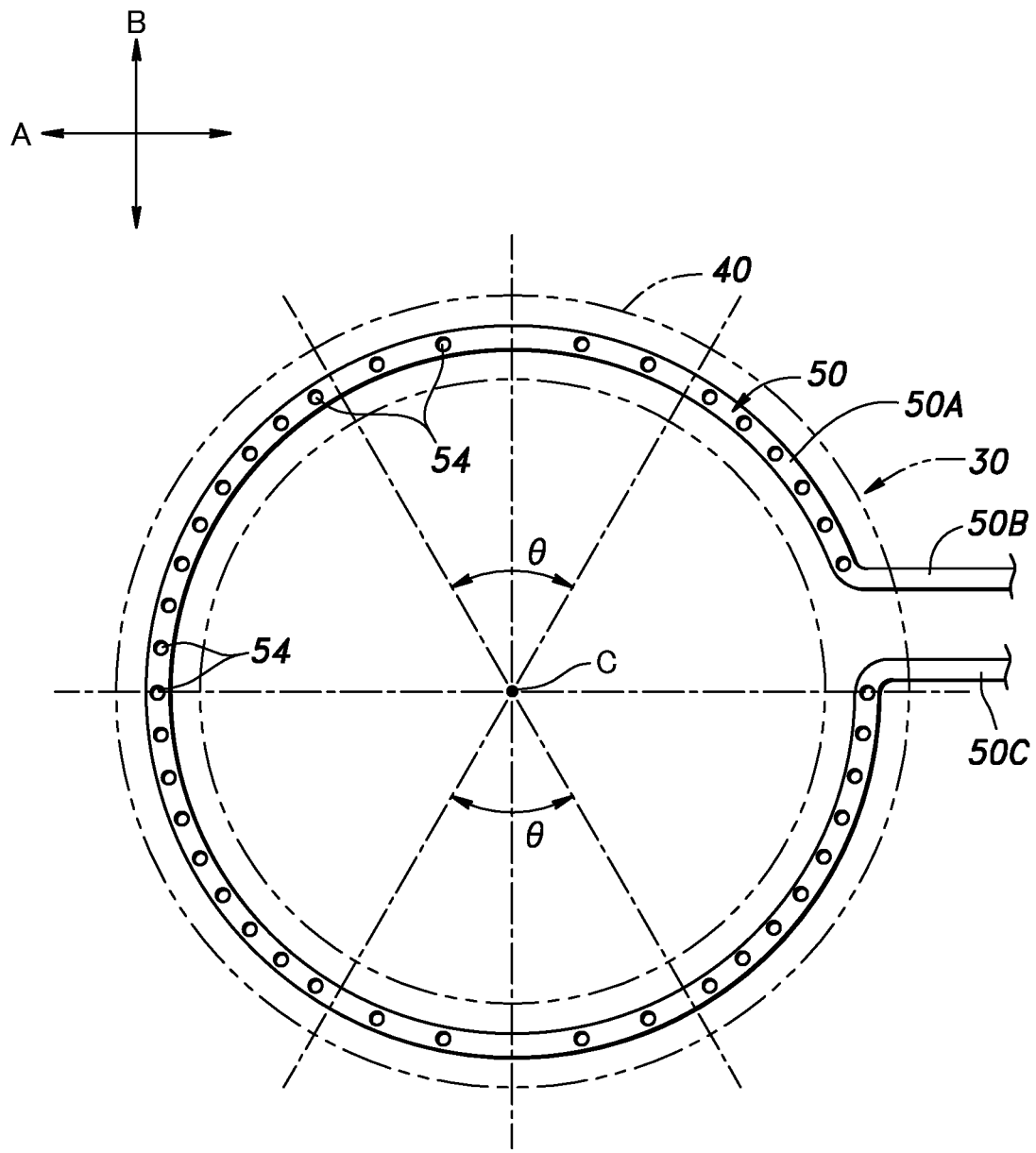
FIG. 5 is a view similar to FIG. 4 showing a cooling oil supply pipe of a cooling structure according to a second embodiment of the present invention.

FIG. 5 shows an electric motor 16 provided with a cooling structure according to a second embodiment of the present invention. The second embodiment is similar to the first embodiment, and the following description is primarily directed to the features of the second embodiment which are different from those of the first embodiment. In FIG. 5, the parts corresponding to those shown in FIG. 4 are denoted with like numerals without necessarily repeating the description of such parts in order to avoid redundancy.

In the second embodiment, the cooling oil holes 54 all have a same diameter, and are not arranged at equal intervals. More specifically, the cooling oil holes 54 on the fore and aft axis B are more sparsely populated than those on the lateral axis A. In other words, the intervals between the adjacent cooling oil holes 54 are smaller in the fore and aft end parts of the cooling oil supply pipe 50 than in the lateral end parts of the cooling oil supply pipe 50. In the illustrated embodiment, the intervals between the adjacent cooling oil holes 54 are uniform except for the fore and aft end parts of the cooling oil supply pipe 50 which are located within an angular range of θ centered around the fore and aft axis. The intervals between the four cooling oil holes 54 on the fore end, and the other four cooling oil holes 54 on the aft end are smaller than those between the remaining cooling oil holes 54.

Thus, the cooling oil that drops onto the fore and aft parts of the stator 30 (those located along or on the fore and aft axis B) is smaller in amount than that drops onto the lateral parts of the stator 30 (those located along or on the lateral axis A). As a result, the amount of cooling oil that enters the air gap G can be minimized so that friction against the rotation of the rotor 28 can be minimized.

The second embodiment is advantageous in that the same drill may be used for forming all of the cooling oil holes 54.

The present invention has been described in terms of specific embodiments, but is not limited by such embodiments, and can be modified without departing from the scope of the present invention. For instance, the differences in the diameters of the cooling oil holes 54 and the population density of the cooling oil holes 54 may be combined to achieve the same goal. The cooling oil holes 54 may not be circular in form, but may take any other form. In such a case, the area of the size of each cooling oil hole 54 determines the amount of oil flow, and those having a relatively smaller opening area will be positioned on the fore and aft axis.

Further, the electric motor of the foregoing embodiments consisted of inner rotor motors, but the present invention is equally applicable to outer rotor motors. In the latter case, the cooling oil holes 54 will be arranged along a circle located slightly radially inward of the outer periphery or the outer profile of the stator (inner stator). The term "cooling oil" should be interpreted as meaning in a broadest possible sense, and covers a wide range of cooling media including substances which are not considered as oily under normal circumstances as long as suitable for use in an electric motor for cooling purpose. The application of the present invention is not limited to watercraft such as boats, but is equally applicable to land vehicles and aircraft.

The invention claimed is:

1. A cooling structure for an electric motor of an electric mobile body, the electric mobile body further including a propelling device connected to the electric motor in a power transmitting relationship, the electric motor including a motor case, a rotor rotatably supported by the motor case around a substantially vertical axis, and a stator fixed to the casing and configured to interact with the rotor, wherein the cooling structure comprises a cooling oil supply member positioned above the stator and including a plurality of outlets for dropping cooling oil on an upper surface of the stator, the outlets being arranged circumferentially in a coaxial relationship to the stator, and wherein the outlets are configured such that an amount of cooling oil that is dropped on a part of the stator located on a first axis on a plane orthogonal to the vertical axis is smaller than an amount of cooling oil that is dropped on a part of the stator located on a second axis which is orthogonal to the first axis on the plane orthogonal to the vertical axis.

2. The cooling structure according to claim 1, wherein the cooling oil outlets are arranged at substantially equal intervals circumferentially, and the cooling oil outlets located on the first axis are smaller in size than those located on the second axis.

3. The cooling structure according to claim 1, wherein the cooling oil outlets are provided with a substantially same size, and the cooling oil outlets are more sparsely populated on the first axis than on the second axis.

4. The cooling structure according to claim 1, wherein the cooling oil supply member comprises a substantially annular pipe member positioned immediately above the stator in a coaxial relationship.

5. The cooling structure according to claim 1, wherein the electric mobile body consists of watercraft, and the electric motor and the propelling device jointly form an outboard motor, the first axis corresponding to a fore and aft axis of the watercraft.

* * * * *